United States Patent [19]

Ziegelmeyer

[11] Patent Number: 4,489,907
[45] Date of Patent: Dec. 25, 1984

[54] SELECTIVELY INTEGRATED THROTTLE SPOILER ACTUATOR FOR AIRCRAFT

[75] Inventor: Harold R. Ziegelmeyer, Medford, Oreg.

[73] Assignee: Precise Flight, Inc., Bend, Oreg.

[21] Appl. No.: 391,459

[22] Filed: Jun. 23, 1982

[51] Int. Cl.³ .............................................. B64C 13/36
[52] U.S. Cl. .................................... 244/203; 244/213; 244/226; 244/78
[58] Field of Search ..................... 244/203, 75 R, 213, 244/214, 215, 76 R, 220, 221, 226, 76 A, 78, 90 A

[56] References Cited

U.S. PATENT DOCUMENTS

| | | | |
|---|---|---|---|
| 2,071,063 | 2/1937 | Florez et al. | 244/213 |
| 2,272,664 | 2/1942 | Gropler | 244/203 |
| 2,532,469 | 12/1950 | Trautman | 244/203 |
| 3,738,594 | 6/1973 | Donovan et al. | 244/76 R |
| 3,774,869 | 11/1973 | Harmon | 244/220 |
| 3,850,388 | 11/1974 | Olcott et al. | 244/75 R |
| 4,270,712 | 6/1981 | Decker et al. | 244/213 |

Primary Examiner—Galen Barefoot
Attorney, Agent, or Firm—Neil J. Driscoll

[57] ABSTRACT

A system for altering the lift/drag characteristics of powered general aviation aircraft whereby flight path control may be exercised. The control device operates in conjunction with such lift/drag altering devices, spoilers, dive brakes and the like, and is physically unitary with the pilot's operation of the throttle control. Utilizing a single control, the pilot may selectively maintain the craft without lift/drag modification, with automatic lift/drag modification at lower power settings such as under landing approach conditions and lift/drag modifications at higher power settings and without modifying the power setting. A vacuum operated valve having simple selectable operational modes provides flight path control desired. Vacuum distribution means, i.e., vacuum lines are provided from a vacuum source, to the vacuum valve and to the spoilers and dive brakes for bellows actuation of the lift/drag altering devices.

5 Claims, 8 Drawing Figures

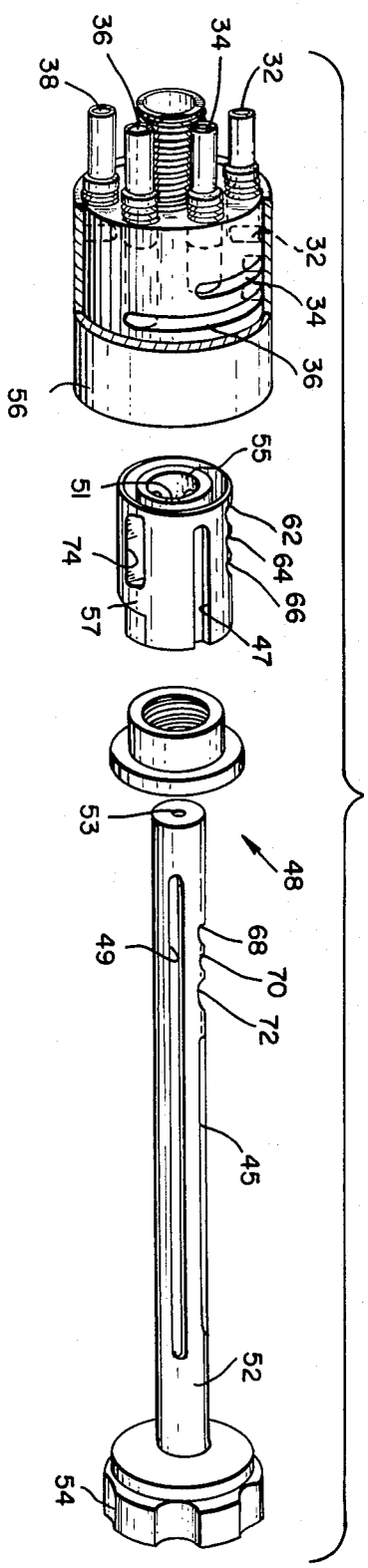
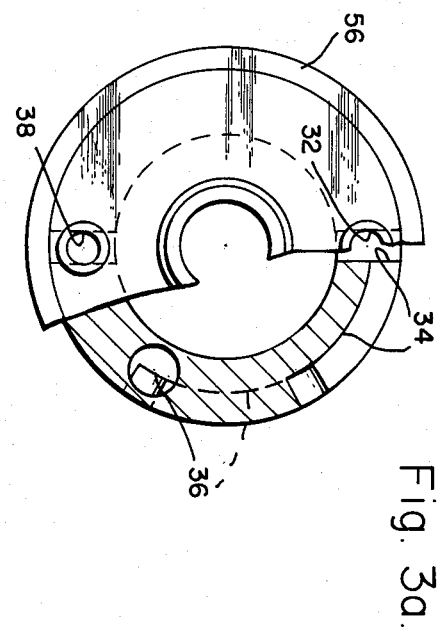
Fig. 3.
Fig. 3a.

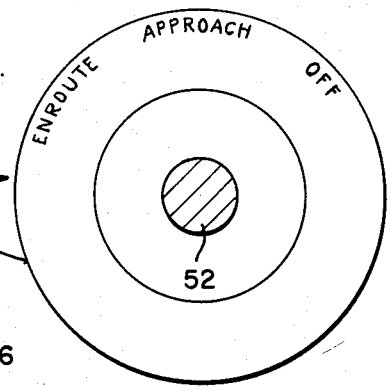
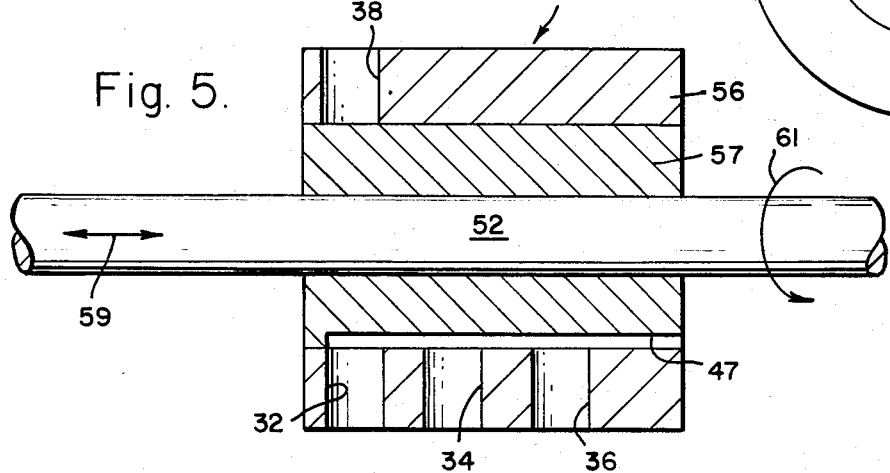
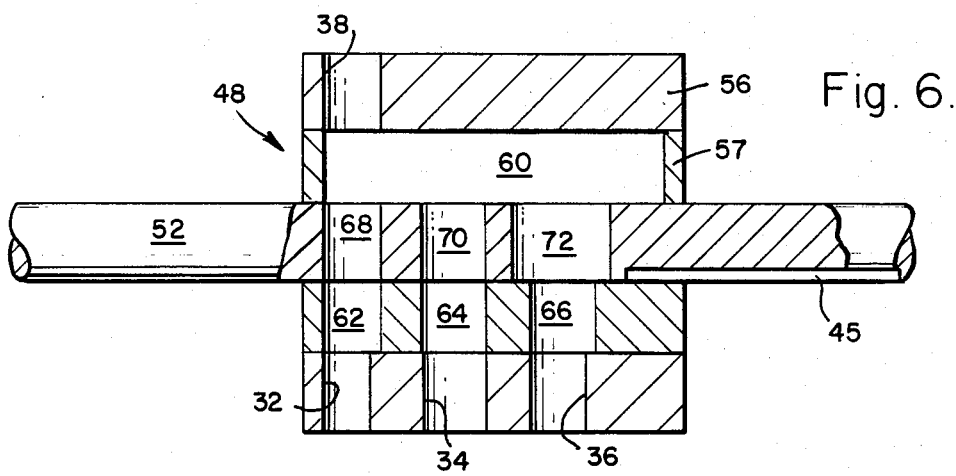
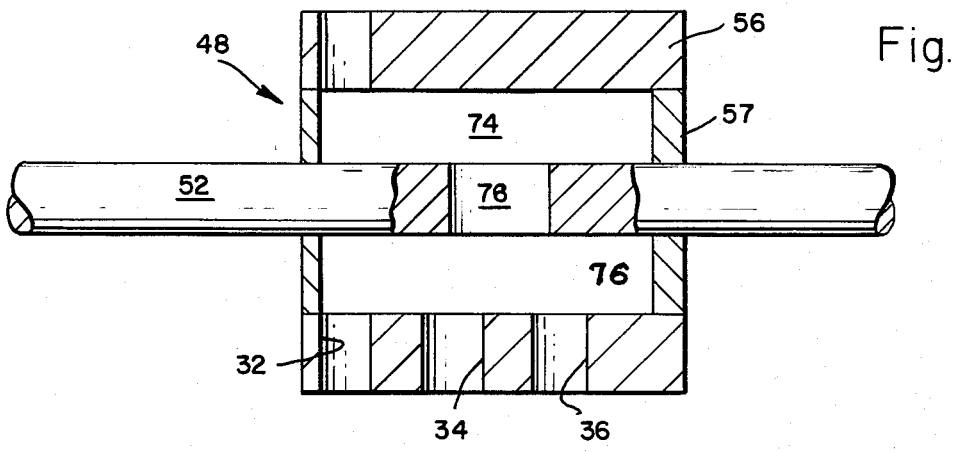

SELECTIVELY INTEGRATED THROTTLE SPOILER ACTUATOR FOR AIRCRAFT

BACKGROUND OF THE INVENTION

1. Field of the Invention

The invention relates to the controlled alteration of the lift/drag ratio of powered aircraft and more particularly to a selectively integrated throttle and spoiler control which enable the pilot of a powered aircraft to selectively modulate the aircraft's descent flight path under a wide range of power conditions.

It is a well known fact that a substantial percentage of general aviation accidents occur in the landing phase of flight. During landing the pilot's task is critical and a high degree of skill must be present to properly approach the runway, flare, touchdown, roll out and occasionally go-around with safety and within the prescribed landing zone. On approach air speed must be controlled within limits that avoid fast settling or stall and yet be slow enough to prevent improper flare or float. After touchdown the craft should be decelerated quickly for proper braking or taxi. In the event of go-around, air speed and flight path must be controlled to assure proper lift and stable flight conditions.

Enroute, ie., cross country air traffic control is also becoming more complex. As a result rapid descents from flight levels are more frequently required, even with general aviation aircraft. These descents usually require large power reductions and slower speed. This can jeopardize cabin pressurization, engine operation and orderly traffic flow.

Modulation of craft lift/drag ratio through the use of spoilers and/or dive brakes has been used on sail planes to provide rapid descent and increase the pilots landing skill. Jet transports use spoilers to reduce ground speed and landing roll upon undercarriage contact with the runway. In addition, there have been prior art attempts to develop spoiler and dive brake application to general aircraft, however, they have not been generally well received. To date not one general aviation air frame manufacturer has incorporated a lift/drag modulation device in the equipment produced. The added cost to original equipment manufacture would, of course, be a partial explanation. It may also be true that the prior art attempts did not possess the simplicity, efficiency and reliability to impress the general aviation industry.

2. Description of Prior Art

One effort to develop lift/drag modulation equipment for general aircraft is described in U.S. Pat. No. 3,850,388, dated Nov. 26, 1974. This patent teaches the integrated control of both an aircraft power throttle and a device for selective operation of lift/drag alteration equipment such as dive brakes and spoilers. A pair of pilot operated levers are provided which are physically adjacent each other. One lever is a throttle lever; the other lever controls the lift/drag equipment. The levers are integrated in the sense that only limited independent operation of the lift/drag operating lever is permitted and then only with a pilot felt resistive force which sensually notifies the pilot of such independent lever operation. During normal throttle down for conventional landing, the throttle lever and lift/drag lever are moved concurrently so that the spoilers and dive brakes are gradually extended as the power is reduced. This gradually increases the angle of steepness of the landing guide path. In the event full power is required, as during go-around, movement of either lever to forward position applies full engine power and concurrently deactivates the spoiler and dive brake equipment. Of course, because of the physical juxtaposition of the levers, both of them may be hand moved concurrently to forward position. The limited movement of the lift/drag lever relative to the throttle lever will provide limited special control situations for a pilot with a proper level of skill.

Another prior art aircraft throttle-spoiler actuator is U.S. Pat. No. 3,774,869, dated Nov. 27, 1973. The teaching of this patent suggests a single manually operated lever which is connected to a linkage and cam mechanism whereby throttle movement to an idle or neutral position as, for example, during landing simultaneously deploys a spoiler and dive brake thereby increasing descent rate. After full spoiler deployment, continued rearward movement of the throttle lever slightly increases engine power for taxi. Rapid forward movement of the throttle lever concurrently retracts the spoiler and brake and applies full engine power. A review of this patent will disclose what appears to be a rather complicated cam and linkage arrangement.

SUMMARY OF THE INVENTION

The control arrangement of the present invention provides the powered aircraft pilot with a simple method of selectively integrating lift-drag control equipment with various modes of throttle operation to controlably effect or modulate the aircraft flight path to increase flight efficiency, safety and preciseness.

It is primary object of the invention to provide a lift/drag controller which may be selectively integrated with the aircraft throttle whereby the lift/drag ratio of the craft may be altered automatically as the throttle engine speed and craft airspeed is reduced to landing configuration.

It is a further object of the invention to provide a lift/drag modulating device of the type described which is so formed and arranged with the throttle structure that pilot control of said lift/drag modulation blends easily with pilot control of craft power.

It is yet another object of the invention to provide a lift/drag controller which may be actuated to lift/drag modulation condition without effect on the craft throttle or power condition, and, within the normal cruise throttle range.

It is still another object of the invention to provide a lift/drag controller which is physically associated with the aircraft throttle equipment and which may be operated in a mode which will not affect the lift/drag condition of the aircraft even though power setting changes are made by the pilot.

It is yet another specific object of the invention to provide a spoiler and dive brake controller which incorporates a novel fluid valve physically connected to and linearly movable with the craft throttle and which my be independently moved angularly relative to the throttle to accomodate selective spoiler and dive brake actuation concurrently with throttle movement or without throttle movement.

These and other objects, features and advantages of the invention will become apparent in the course of the following description of a presently preferred invention embodiment.

BRIEF DESCRIPTION OF THE DRAWINGS

FIG. 3 is an exploded perspective view of a valve and throttle device of the invention.

FIG. 3a is a left end, fragmentary and partially sectioned view of the assembly of the outer cylinder.

FIG. 4 is an end elevational view of the valve body showing the angular relation of the three different modes of operation.

FIG. 5 is a schematic in central vertical section showing the internal valve porting in the "OFF" operational configuration.

FIG. 6 is a schematic in central vertical section showing the internal valve porting in the "APPROACH" operational configuration, and FIG. 7 is a schematic in central vertical section showing the internal valve porting in the "ENROUTE" operational configuration and with the spoiler and dive brake actuated for lift/drag modulation.

DESCRIPTION OF A PREFERRED EMBODIMENT

Figure 1:
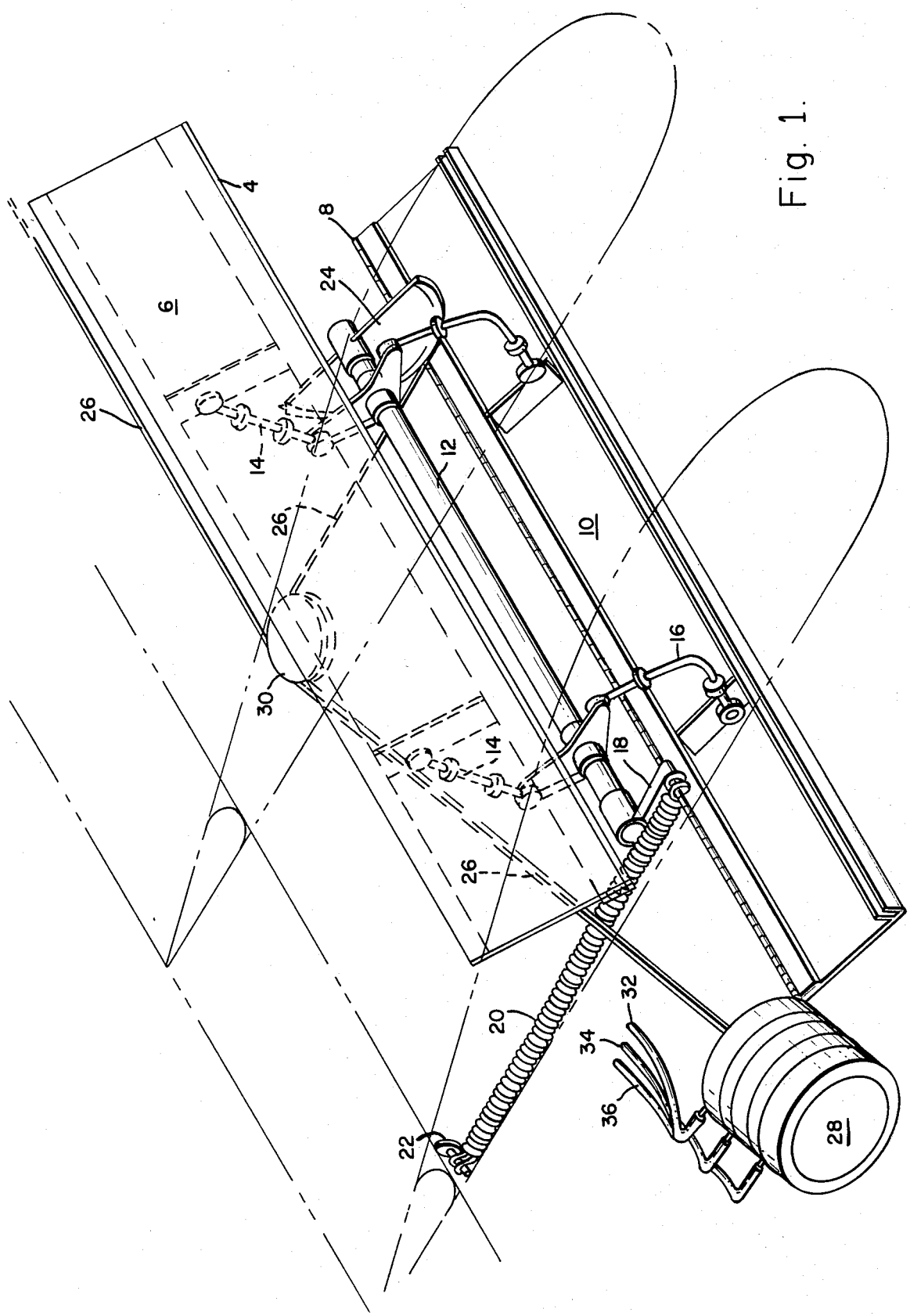
FIG. 1 is a perspective illustration of spoiler and dive brake structure shown in situs in the right wing of a general aviation aircraft, the wing being shown in phantom.

FIG. 1 shows, in phantom, a portion of a conventional airfoil such as the wing of a general aviation light aircraft. On the upper surface of the wing a hinge line 4 is provided to which is pivotally connected a spoiler 6. On the lower wing surface a second hinge line 8 is provided for pivotally mounting a dive brake 10. A torque tube 12 my be conventionally pivoted to the wing structure (not shown) and carries conventional spoiler connecting linkage 14,14 and conventional brake connecting linkage 16,16. The torque tube 12 has a crank arm at one end, which connects to return spring 20, the latter being secured to the wing as at 22. A cable quadrant 24 is mounted on another end of tube 12 and has a connected cable 26 which is operatively connected to bellows 28 via pulley 30. The spoiler 6 and brake 10 are shown open that is, in lift/drag altering position. When the bellows 28 is not operating, the cable 26 is relaxed and the spring 20 will rotate crank 18 to a return condition which will pivot spoiler 6 and brake 10 to closed position. The bellows 28 is a multicompartment bellows and my have as many as three vacuum lines 32, 34 and 36 communicating with respective bellows compartments. The structure described is conventional and will be familiar to persons skilled in the aircraft arts. Bellows manufacturers may be located by reference to any industrial register under that classification.

Figure 2:
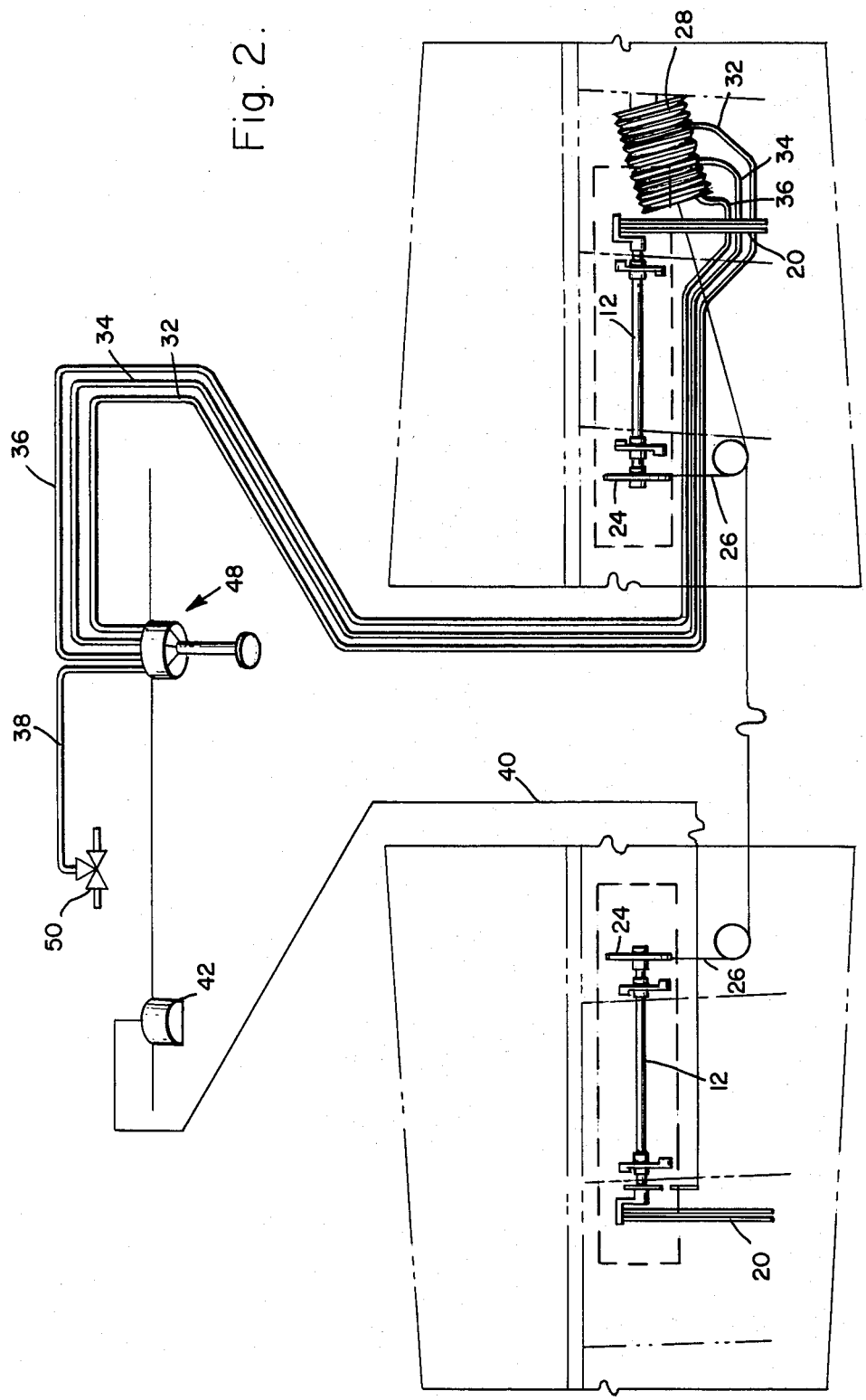
FIG. 2 is a schematic diagram of the operative control arrangement of the present invention.

FIG. 2 is a schematic diagram particularly useful in an understanding of the general operation of the arrangement. The cables 26,26 are connected to the multicompartment bellows 28, one of the cables 26 connecting to the cable quadrant 24 on the left wing torque tube 12 and the other cable 26 connecting to the cable quadrant 24 on the right wing torque tube 12. The structure and operation of the torque tubes and the connected spoilers and dive brakes were described in connection with FIG. 1.

From a system standpoint, the collapse of bellows 28 under an internal vacuum action pulls cables 26,26 and opens the spoilers and dive brakes on the left and right aircraft wings. The bellows relax when the internal vacuum is dissipated and the return springs 20,20 return the spoilers and brakes to closed position. An electric lead 40 may be operatively connected to one of the torque tubes 12 and to a position indicator 42 in the craft cockpit which will indicate to the pilot the degree of spoiler and brake open position. The vacuum tube lines 32, 34 and 36 communicate with a combination throttle and controller valve, indicated generally at 48 (FIG. 2) and which is located in the pilot compartment or cockpit. A fourth vacuum line 38 connects with valve 48 which, in turn, communicates with a vacuum source 50. Any vacuum source may be utilized, but the conventional vacuum pump normally driven by the aircraft engine is satisfactory.

The unitary hand throttle and ratio alteration controller valve 48 are shown in FIG. 3. The valve has three major components, a central rod 52 incorporating a manual handle head 54 at its right aspect which the pilot may grasp. The left aspect of rod 52 is conventionally connected as by threaded hole 53 to an engine throttle cable (not shown). Movement of the cable varies engine speed. Pushing the rod 52 to the left increases engine speed to maximum and pulling rod 52 to the right decreases engine speed to idle. Connections for vacuum lines 32, 34, 36 and 38 to the valve 48 are also shown.

An outer cylinder 56 receives a coaxial spool 57 centrally therein. The spool 57 is axially non-movable in cylinder 56, but is free to rotate angularly within the cylinder 56. The spool 57 is provided with a central aperture 55 which receives rod 52. A conventional key 51 and slot 49 connection is provided between spool 57 and rod 52 which allows rod 52 to move within fixed cylinder 56 and the spool 57 will rotate concurrently with rod 52 and within the cylinder 56.

Attention is now directed to FIGS. 4 through 7 for a complete understanding of the operation of the arrangement. FIG. 4 is an elevational view of the valve 48 with the handle head 54 removed from rod 52. As indicated in FIG. 4 there are three facets or modes in which the system may operate. They are indicated by the legends ENROUTE, APPROACH and OFF on the face of cylinder 56.

FIG. 5 illustrates the porting condition in valve 48 when the disclosed system is in the OFF configuration. In this condition the pilot has rotated rod 52 and spool 57 to the maximum right or clockwise position. Spool closes tube 38 and establishes communication between bellows tubes 32, 34 and 36 and atmosphere via slot 47. Bellows 28 is relaxed and spoilers 6,6 and brakes 10,10 are closed. This is true regardless of the throttle position of rod 52.

FIG. 6 illustrates the "Approach" mode of equipment operation. The pilot rotates rod 52 counterclockwise and connected spool 57 until aligned with the APPROACH legend. A conventional detent (not shown) may be used to hold rod 52 in this rotative position. In this position cavity 60 of spool 57 is aligned and communicating with vacuum line 38. Ports 62, 64 and 66 are linearly and axially aligned with vacuum lines 32, 34 and 36. As rod 52 is moved to the right, openings 68, 70 and 72 in rod 52 sequentially communicate with ports 62, 64 and 66 and sequentially convey vacuum pressure to the respective compartments of the tri-compartment bellows 28. The bellows sequentially collapses, and via cables 26, 26 the spoilers 6,6 and the dive brakes 10,10 are gradually opened to full position. Please note that the movement of rod 52 to the right to sequentially register openings 68, 70 and 72 with ports 62,64 and 66 is in the throttle range and engine speed normally used on landing glides and approaching an engine idle power setting. It is preferred that port 72 be about fifty percent wider than ports 68 and 70. In the event throttle rod 52 is rapidly moved to the left toward full power position, port communication is broken and lines 32, 34 and 36 communicate with atmosphere via slot or channel 45. This atmospheric communication destroys the vacuum condition in bellows 28 and springs 20 close the brakes and spoilers.

Attention is directed to FIG. 3 and particularly the left aspect thereof. It will be seen that a portion of cylinder 56 has been broken to show annular hole 32 and annular slots 34 and 36 formed in an inner surface of cylinder 56. It is annular holes and slots coupled with axially drilled holes that establishes communication with vacuum lines 32, 34 and 36.

FIG. 7 is illustrative of the ENROUTE mode of equipment operation. Note that the cavities 74 and 76 in spool element 57 are relatively long. The opening 78 in rod 52 keeps communication established between cavities 74 and 76 through a long range of left-right movement of rod 52, ie., a wide range of engine speeds. These engine speeds are approximately in the thirty to seventy percent range of full throttle, that is, in the lower cruise ranges. To achieve this condition, the pilot merely rotates rod 52 to the left, ie., counterclockwise, to maximum position and vacuum from line 38 is immediately carried via lines 32, 34 and 36 to the tri-compartment bellows resulting in immediate and full opening of the spoilers 6, 6 and the dive brakes 10, 10. This can be used for rapid full speed descent from cruise altitudes. Conventional spring means (not shown) may be used to bias rod 52 to a clockwise position.

To summarize the preceding disclosure, a fluid pressure valve system has been integrated with a standard throttle control on a general aviation aircraft. The fluid pressure utilized is preferably vacuum because of its availability in normal aircraft operation, but it will be understood that other pressure sources may be adapted to the invention. It may also be appropriate to vary the number of compartments in the bellows arrangement and thus vary control sensitivity. The selectively integrated valve and throttle control plus the vacuum pressure distributuion means enables the craft pilot to instantly alter the lift/drag ratio of his craft during normal enroute cruise thus accomplishing full speed and rapid altitude loss. When landing the craft, the pilot may selectively elect to land the craft in a normal lift/drag configuration or provide for the automatic alteration of the lift/drag characteristics of his craft to increase the rapidity of descent concurrently with the craft's power condition and engine speed being at the power settings for normal landing. It is also interesting to note that even though the lift/drag ratio is altered and the rapidity of descent increased, the craft's airspeed is maintained in normal landing ranges resulting in smooth flaring and settling of the craft to the runway. The speed of the craft after landing is rapidly reduced for ease in taxi control. The net effect of the utilization of the disclosed invention is increased pilot skill and control with a consequent addition to flying safety.

The invention as disclosed is by the way of illustration and not limitation and may be subject to modification all within the spirit and scope thereof.

What is claimed is:

1. In an engine driven aircraft having lift and drag alteration means thereon, a manually movable throttle control to regulate the speed of the engine, said throttle control comprising a pilot movable rod which is moved in a forward and rearward direction to vary the speed of the engine, fluid pressure means adapted to drive the alteration means to actuate same and thereby vary the lift and drag ratio of the aircraft, regulating means to control the connection of said fluid pressure means and said alteration means, said regulating means and said throttle control being directly integrated whereby manual movement of said throttle control to lower range engine speeds causes the regulating means to connect the alteration means with said fluid pressure means whereby the alteration means are actuated to change the lift and drag ratio of said aircraft and movement of said throttle control to higher range engine speeds disconnects said alteration means and pressure means, said regulating means comprising a valve fixedly mounted on the aircraft, said pilot movable rod being an operative portion of said valve and pilot movable in a plurality of other directions in addition to said forward and rearward direction, movement of said rod in one of said other directions being operative to selectively connect the pressure means and the alteration means and to actuate the latter concurrently with lower engine speeds and movement of the rod in another of said last mentioned directions being operative to disconnect the pressure means and the alteration means and deactuate the latter.

2. In an engine driven aircraft having lift and drag alteration means thereon, a manually movable throttle control member to regulate the speed of the engine, fluid pressure means adapted to drive the alteration means to actuate the same and thereby vary the lift and drag ratio of the aircraft, regulating means to control the action of said fluid pressure means on said alteration means by selectively connecting and disconnecting the pressure and alteration means, said throttle control member being an operative portion of said regulating means and movable in a forwardly and rearwardly direction relative to the regulating means to respectively increase and decrease the engine speed, said throttle control member being rotatably movable relative to the regulating means into first, second and third operative positions, and selectively cooperating port means within the control member and the regulating means, said port means being arranged in said first operative position to prevent any connection between said fluid pressure means and said alteration means in all forwardly and rearwardly positions of said control member;

said port means being arranged in said second operative posotion to establish connection between the fluid pressure means and said alteration means to actuate the latter and during only the directional movements of the control member which decrease engine speed toward the engine idle condition;

said port means being arranged in said third operative position to establish connection between the fluid pressure means and said alteration means to actuate the latter and only during directional movement and position of said control member of increasing and higher engine speeds.

3. In a valve arrangement for operative association with a throttle control on a fixed wing, engine driven aircraft having lift/drag modulating means theron; the combination of a valve body fixedly mounted on the aircraft;

a rod member in the valve body and movable by the aircraft pilot with the throttle control as the latter increases and decreases engine speed and power;

a source of fluid pressure having a differential level in relation to ambient;

first pressure distribution means connecting the pressure source to the valve body;

second pressure distribution means connecting the valve body with the lift/drag modulating means;

said modulating means being activated from an inoperative to an operative condition by said fluid pressure;

said rod member being movable angularly within said valve body to a plurality of angular positions relative to the body and independent of the concurrent movement of the rod member and throttle control; and first port means in the rod member operative to interconnect the first and second distribution means to thereby actuate said modulating means when said rod member is in a first of said plurality of angular positions and when the pilot moves said throttle control and said rod member to decrease said engine speed and power.

4. A valve arrangement according to claim 3, and including second port means in said rod member operative to interconnect the first and second distribution means to activate said modulating means when said rod member is moved angularly by the pilot to a second of said plurality of angular positions and at higher speed and power positions of said throttle control and rod member.

5. A valve arangement according to claim 4, wherein a thrid angular position of said rod member is provided which prevents an interconnection of said first and second distribution means during all concurrent movements of the throttle control and rod member.

* * * * *